US008881564B2

(12) United States Patent
Burns et al.

(10) Patent No.: US 8,881,564 B2
(45) Date of Patent: Nov. 11, 2014

(54) FREE FLOATING PADDLE ACTUATION SYSTEM

(75) Inventors: Jayden Burns, Lime Springs, IA (US); David L. Root, Tripoli, IA (US); Alexander C. Everett, Charles City, IA (US); Jennifer L Bearman, New Hampton, IA (US)

(73) Assignee: Trimark Corporation, New Hampton, IA (US)

( * ) Notice: Subject to any disclaimer, the term of this patent is extended or adjusted under 35 U.S.C. 154(b) by 272 days.

(21) Appl. No.: 13/549,114

(22) Filed: Jul. 13, 2012

(65) Prior Publication Data

US 2014/0013812 A1 Jan. 16, 2014

(51) Int. Cl.
*B60R 25/02* (2013.01)

(52) U.S. Cl.
USPC .......... 70/208; 292/35; 292/48; 292/DIG. 27; 292/DIG. 31

(58) Field of Classification Search
CPC ....... E05B 7/00; E05B 81/00; E05B 63/0069; E05B 79/12; E05B 85/14; E05B 13/101; E05B 47/00; E05B 5/00; E05B 5/006; E05B 85/18; E05C 1/145; E05C 9/046
USPC ...... 70/275, 207–210; 292/DIG. 25, DIG. 27, 292/DIG. 31, 45, 48, 35, 227, 228
See application file for complete search history.

(56) References Cited

U.S. PATENT DOCUMENTS

| | | | | |
|---|---|---|---|---|
| 5,117,665 | A | 6/1992 | Swan et al. | |
| 5,174,619 | A | 12/1992 | Bender et al. | |
| 5,941,104 | A | 8/1999 | Sadler | |
| 6,513,353 | B1 * | 2/2003 | Weinerman et al. | 70/208 |
| 6,543,821 | B1 * | 4/2003 | Weinerman et al. | 292/123 |
| 6,629,711 | B1 | 10/2003 | Gleason et al. | |
| 6,708,537 | B1 | 3/2004 | Eschweiler et al. | |
| 6,758,503 | B2 * | 7/2004 | Sadler | 292/35 |
| 6,854,304 | B2 * | 2/2005 | Linares | 70/208 |
| 8,146,394 | B2 * | 4/2012 | Krueger | 70/279.1 |
| 8,186,191 | B2 * | 5/2012 | Bacon | 70/208 |
| 8,347,667 | B2 * | 1/2013 | Bacon | 70/107 |
| 8,393,187 | B2 * | 3/2013 | Bacon | 70/107 |
| 8,579,337 | B2 | 11/2013 | Hidding et al. | |
| 2003/0111845 | A1 * | 6/2003 | Sadler | 292/35 |
| 2011/0181055 | A1 | 7/2011 | Hidding et al. | |
| 2012/0274457 | A1 * | 11/2012 | Burns et al. | 340/425.5 |

* cited by examiner

*Primary Examiner* — Suzanne Barrett
(74) *Attorney, Agent, or Firm* — McKee, Voorhees & Sease

(57) ABSTRACT

A free floating paddle handle assembly is provided for a vehicle door having a latch. The handle assembly includes a housing with a pivotal paddle on the front and a logic assembly on the back. The handle can be pulled from its neutral or rest position to an actuated position so as to rotate the logic assembly when a lock cylinder is unlocked so as to release the latch. When the lock cylinder is locked, the paddle free floats and does not move the logic assembly, such that the logic assembly is inoperative and the latch remains closed.

24 Claims, 16 Drawing Sheets

FREE FLOATING PADDLE ACTUATION SYSTEM

BACKGROUND OF THE INVENTION

Paddle-type door handles are well known for opening a door latch mechanism in various types of vehicles, including automobiles, industrial vehicles, utility vehicles, commercial vehicles and recreational vehicles. Typically, the paddle handle is mounted on the outside of the door, which may be a passenger door or a compartment door. The handle is connected to the latch mechanism through one or more linkages so as to release the latch and open the door. Many handles are provided with a lock to preclude unauthorized entry into the vehicle or the compartment. Normally, when the door is locked, the paddle handle does not move. However, some users mistakenly believe that the locked handle is merely stuck, and pull harder on the paddle in an attempt to open the door, which may lead to breakage of one or more components of the paddle handle.

Therefore, a primary objective of the present invention is the provision of an improved paddle handle assembly for a vehicle door which is free floating when the door is locked.

A further objective of the present invention is the provision of an improved paddle handle wherein a lock arm moves between locked and unlocked positions so that a paddle will unlatch a door latch only when the lock arm is unlocked.

Yet another objective of the present invention is the provision of a free floating paddle handle for a vehicle door latch wherein the logic assembly is operative when the lock cylinder is unlocked and inoperative when the lock cylinder is locked.

Still another objective of the present invention is the provision of a free floating paddle handle which engages the logic assembly when the key cylinder is unlocked and disengages from the paddle assembly when the key cylinder is locked.

Another objective of the present invention is the provision of a free floating paddle handle having a logic assembly with a drive plate and a driven plate, which are connected so as pivot in unison when the paddle is pulled with the lock arm unlocked and which remains stationary when the paddle is pulled with the lock arm locked.

Yet another objective of the present invention is the provision of a paddle handle assembly which is economical to manufacture and durable and safe in use.

A further objective of the present invention is the provision of a handle assembly which can be easily connected to a power actuator for power locking and unlocking of a vehicle door.

These and other objectives will become apparent from the following description of the invention.

SUMMARY OF THE INVENTION

An improved paddle handle assembly is provided for a vehicle door having a latch mechanism movable between latched and unlatched positions. The handle assembly includes a housing with interior and exterior sides, and a paddle pivotally mounted on the front of the housing for movement between a rest or neutral position and a pulled or actuated position. A logic assembly is mounted on the back side of the housing. The logic assembly includes a drive plate, a driven plate, and a lock arm, all of which are pivotally mounted on the housing. The driven plate is connected to the latch mechanism by linkage arms. The lock arm is also pivotal between locked and unlocked positions. The paddle is mounted on an axle, which in turn is connected to a drive arm. A key lock cylinder with an actuator is mounted in the housing and can be selectively set in a locked or unlocked condition. When the key cylinder is unlocked and the paddle is pulled, the drive arm engages the drive plate to pivot the drive plate and driven plate in unison and thereby open or release the latch. When the key cylinder is locked, the lock arm rotates the drive plate out of alignment from the drive arm, such that when the handle is pulled, the logic assembly does not actuate and the latch remains closed. Thus, the paddle free floats when the key cylinder is locked.

DETAILED DESCRIPTION OF THE DRAWINGS

Figure 1:
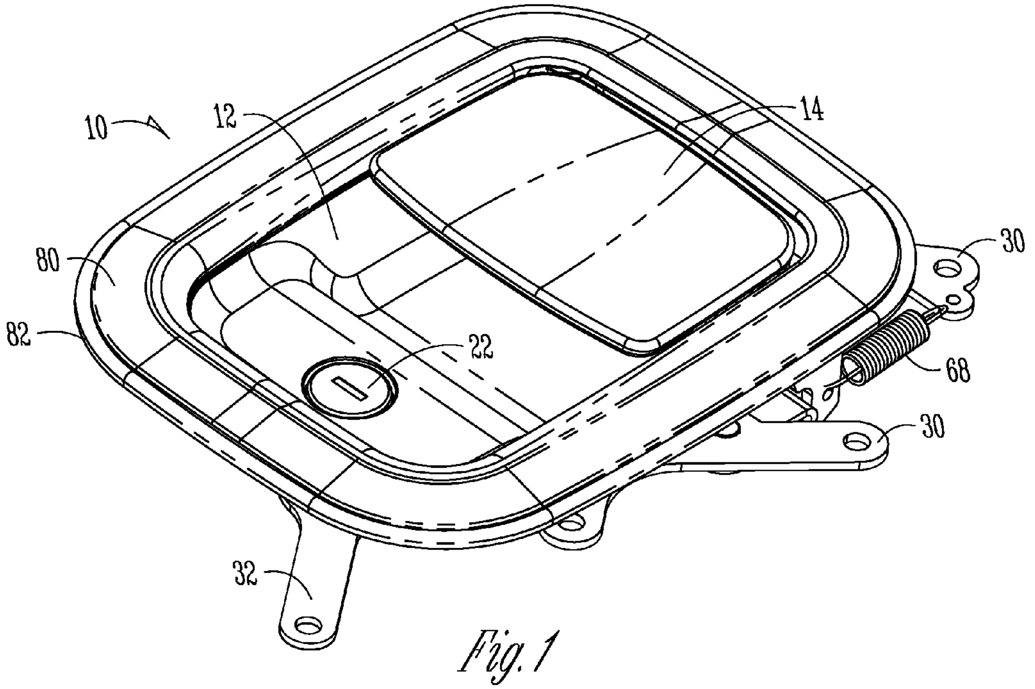
FIG. 1 is a front perspective view of the free floating paddle handle assembly of the present invention.
Figure 2:
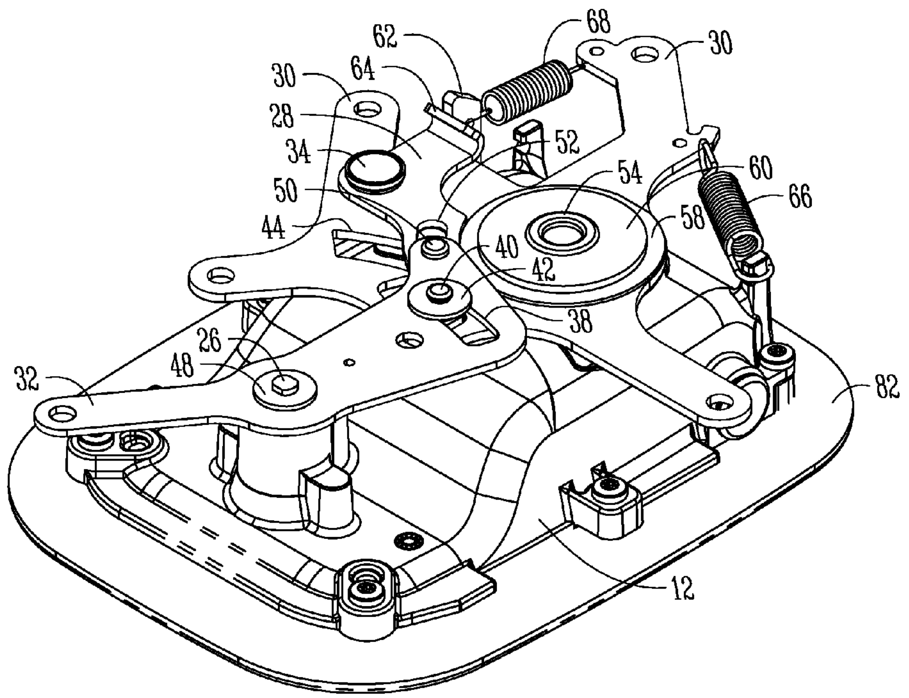
FIG. 2 is a rear perspective view of the free floating paddle handle assembly of the present invention.

The free floating paddle handle assembly of the present invention is generally designated in the drawings by the reference numeral 10. The handle assembly 10 includes a housing 12, a paddle 14 pivotally mounted to the housing for movement between a rest or neutral position and a pulled or actuated position, and a logic assembly mounted on the rear or interior side of the housing 12. The handle assembly 10 is intended for, but not limited to, use on the outside or exterior of a vehicle door to provide access to the interior of the vehicle or a vehicle compartment. The handle assembly 10 is operatively connected to the latch mechanisms (not shown) of the vehicle which allow the door to be opened and closed.

The paddle 14 is mounted to the front or exterior side of the housing 12 with an elongated pin or axle 18, and appropriate bushings 20, with an O-ring 21 to inhibit moisture migration.

Figure 3:
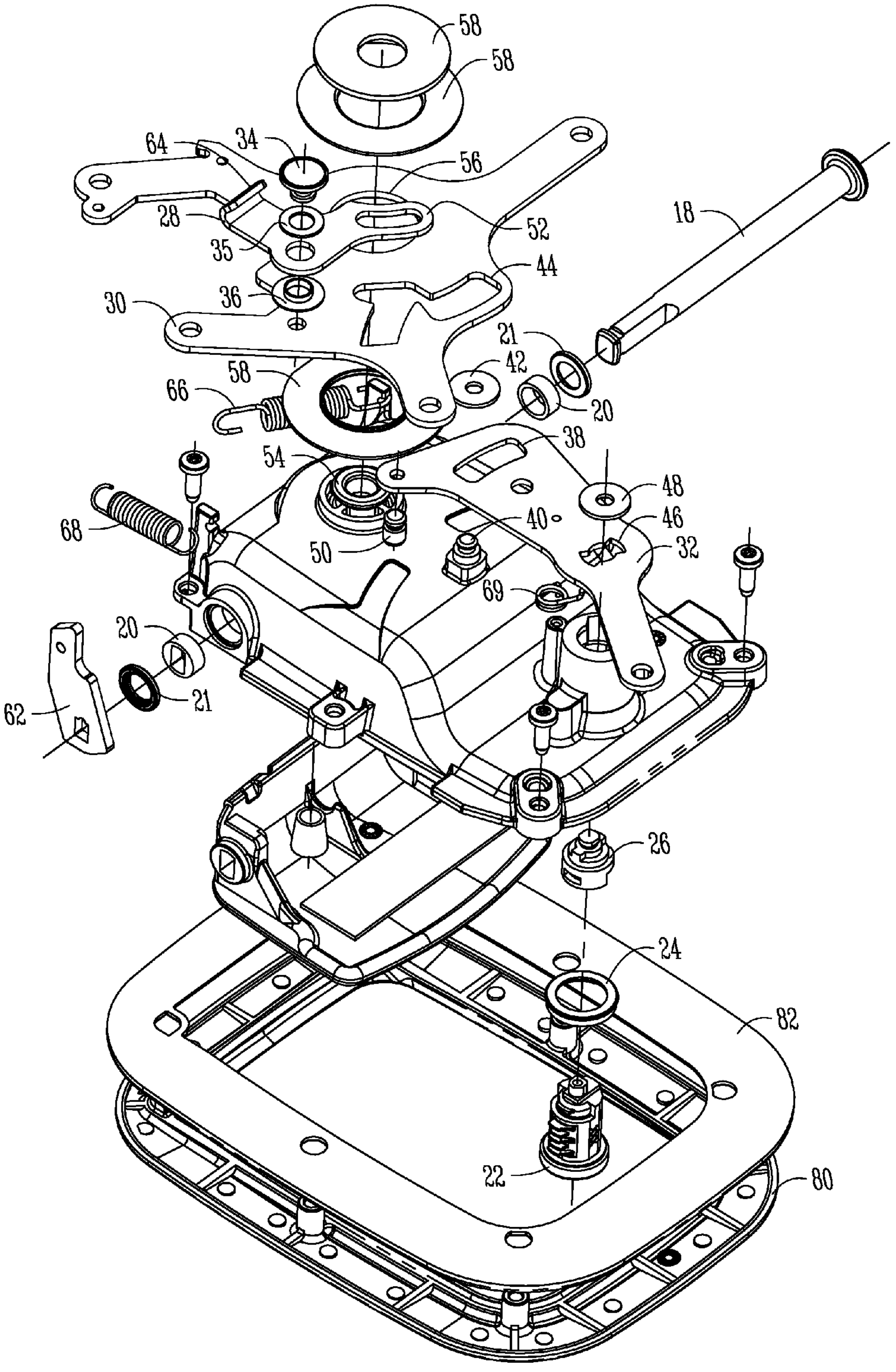
FIG. 3 is an exploded perspective view of the handle assembly shown in FIGS. 1 and 2.
Figure 4:
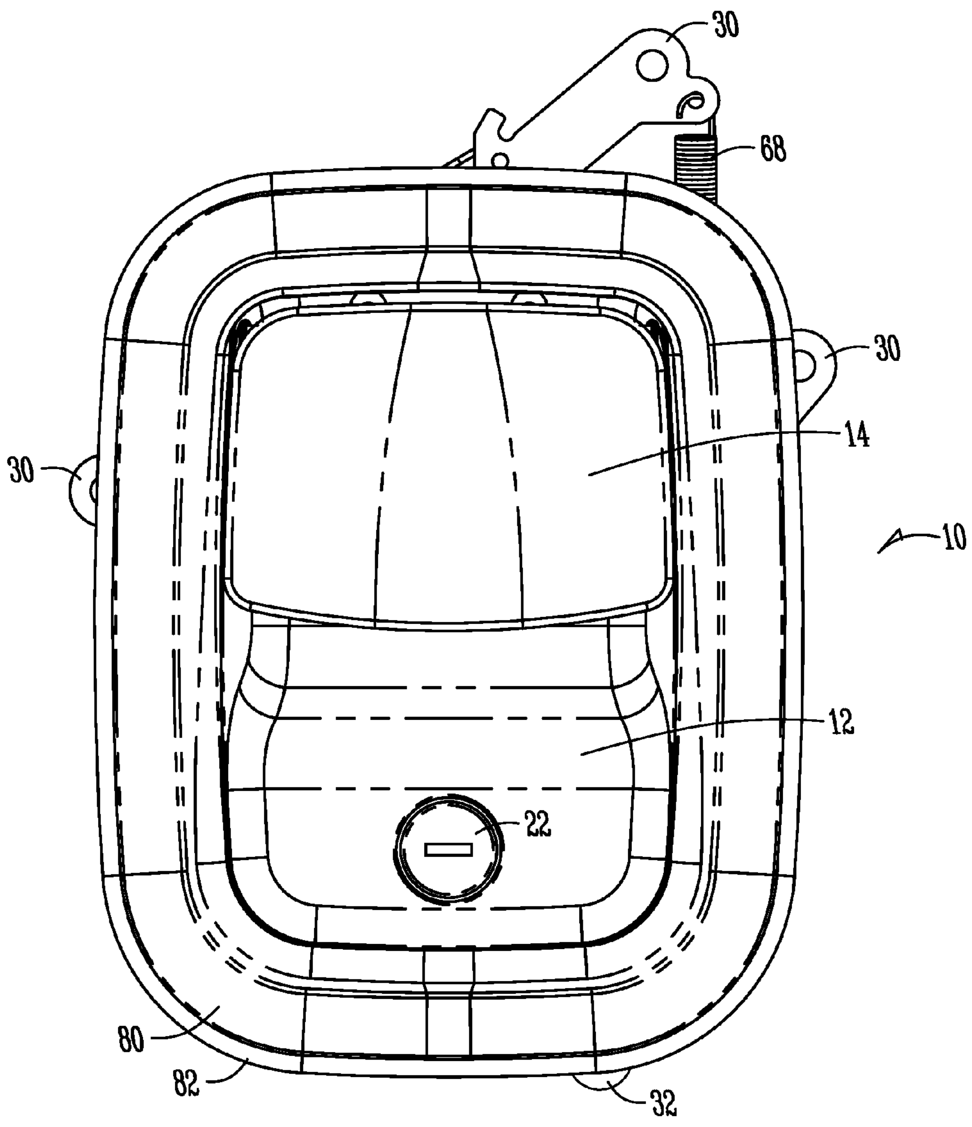
FIG. 4 is a front elevation view of the handle assembly.

The housing 12 also includes a lock cylinder 22, with a seal 24 and an actuator 26, as best seen in FIG. 3. The lock cylinder rotates in opposite directions from a home or neutral position to lock and unlock positions.

The logic assembly has three primary components: a drive plate 28, a driven plate 30, and a lock arm 32. The drive plate 28 and driven plate 30 are connected by a rivet 34, with a washer 35 residing between the head of the rivet 34 and the drive plate 28 and a bushing 36 on the rivet 34 between the drive plate 28 and the driven plate 30.

The lock arm 32 includes a slot 38. A pin 40 extending upwardly from the housing 12 extends through the slot 38, with a washer 42 provided on the top of the pin 40 to retain the lock arm 32 beneath the swedged head of the pin 40. The pin 40 also extends through a slot 44 in the driven plate 30.

The lock arm 32 also includes a butterfly slot 46 through which the tip of the actuator 26 extends. A washer 48 fits over the lock arm 32 and the tip of the actuator 26, and the tip is swedged to retain the lock arm 32 on the actuator 26.

Another pin 50 is secured to the lock arm 32. The pin 50 extends through a slot 52 in the drive plate 28 and through the slot 44 in the driven plate 30. The drive plate 28 resides between the driven plate 30 and the lock arm 32.

The driven plate 30 is mounted on a stub shaft 54 extending from the housing 12 and through an opening 56 in the driven plate 30. A bushing 58 is provided on each side of the driven plate 30 and a washer 60 retains the driven plate 30 on the shaft 54.

A drive arm 62 is fixed on the end of the paddle axle 18 on the exterior of the housing 12. The free end of the drive arm 62 is adapted to engage a tab 64 on the drive plate 28.

A spring 66 has a first end connected to the housing 12 and a second end connected to the driven plate 30. A second spring 68 has a first end connected to the drive arm 62 and a second end connected to the driven plate 30. The springs 66, 68 bias the driven plate 30 and the drive arm 62, respectively, to a neutral or de-actuated position when the paddle 14 is at rest or in the neutral position.

An over-center spring 69 has opposite ends secured to the housing 12 and to the lock arm 32 so as to bias the lock arm 32 to the fully locked or fully unlocked positions. A lock arm 32 has lost motion via the butterfly slot 44, so as to allow the lock cylinder 22 to return to its home position for key removal, while the lock arm 32 remains biased in the locked or unlocked position, as is conventional in the art.

The handle assembly 10 also includes an ornamental trim bezel 80 with an underlying gasket 82. The housing 12 and paddle 14 form a paddle module which is compression mounted with the bezel 80 onto a door panel, as described in Applicants' co-pending application Ser. No. 13/549,210 filed on Jul. 13,2012, and entitled, "COMPRESSION MOUNTED PADDLE HANDLE", with the same inventors. This co-pending application is incorporated herein by reference.

Figure 5:
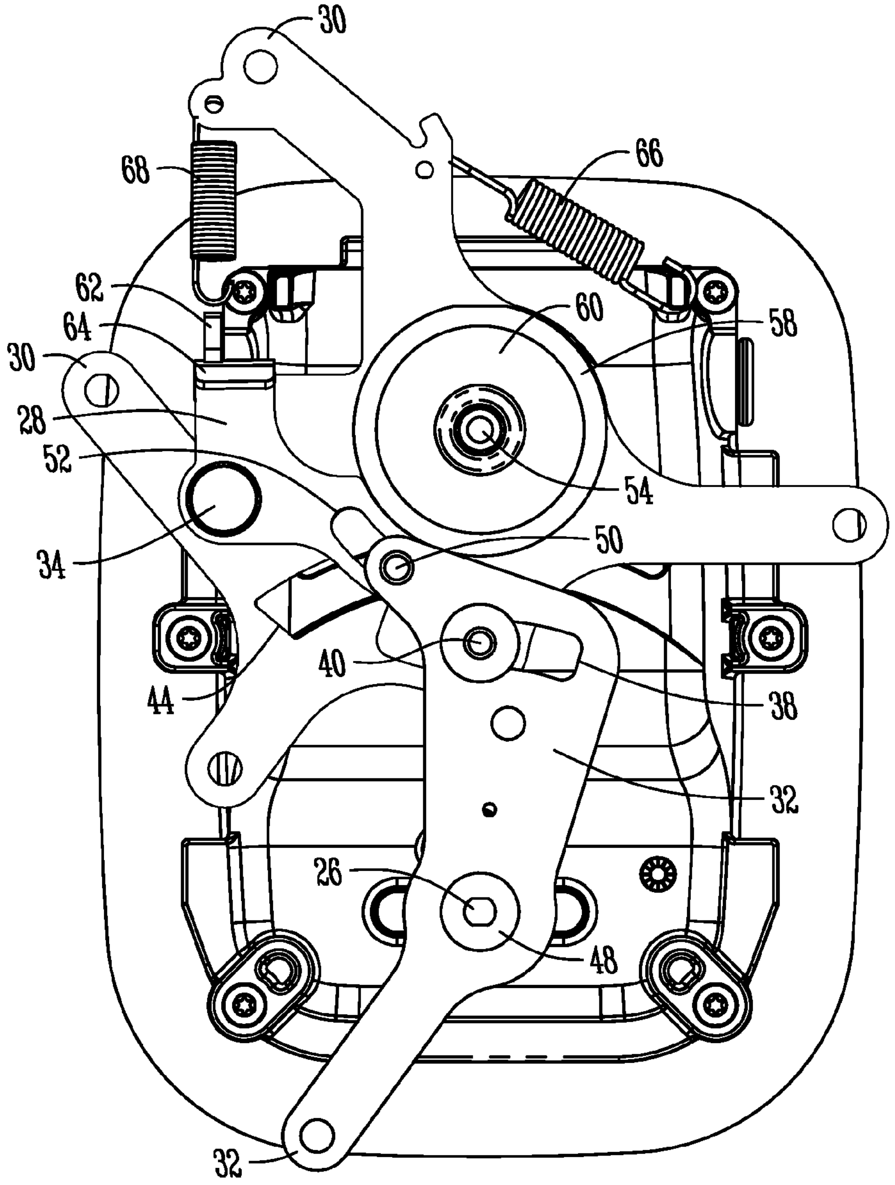
FIG. 5 is a rear elevation view of the handle assembly in an unlocked condition and the paddle at rest.
Figure 6:
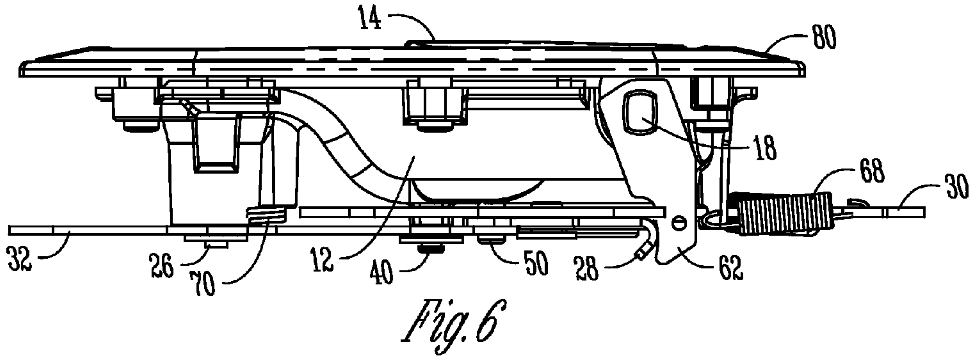
FIGS. 6 and 7 are opposite side views of the handle assembly unlocked and at rest.
Figure 7:
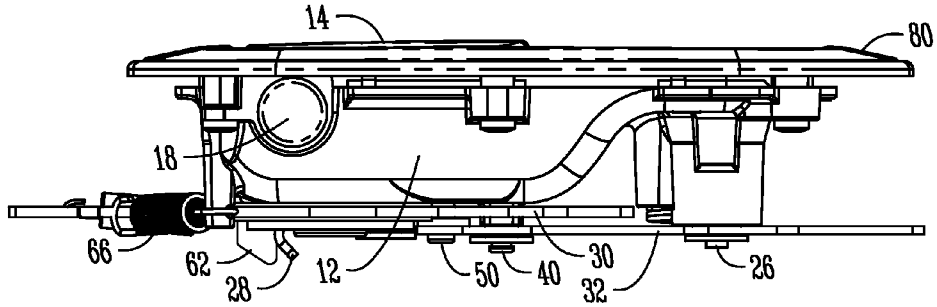
Figure 8:
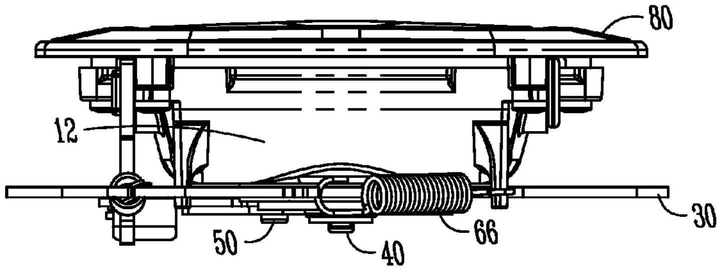
FIGS. 8 and 9 are opposite end views of the handle assembly unlocked and at rest.
Figure 9:
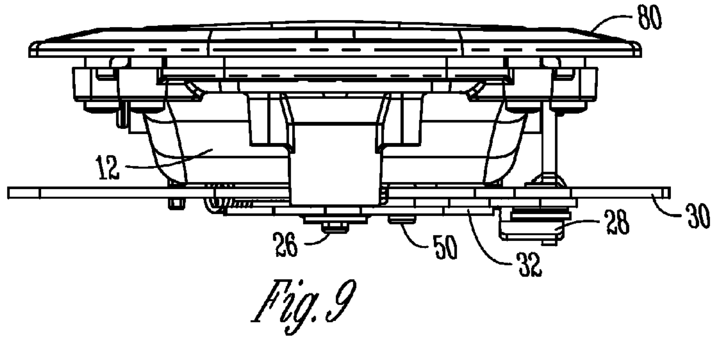
Figure 10:
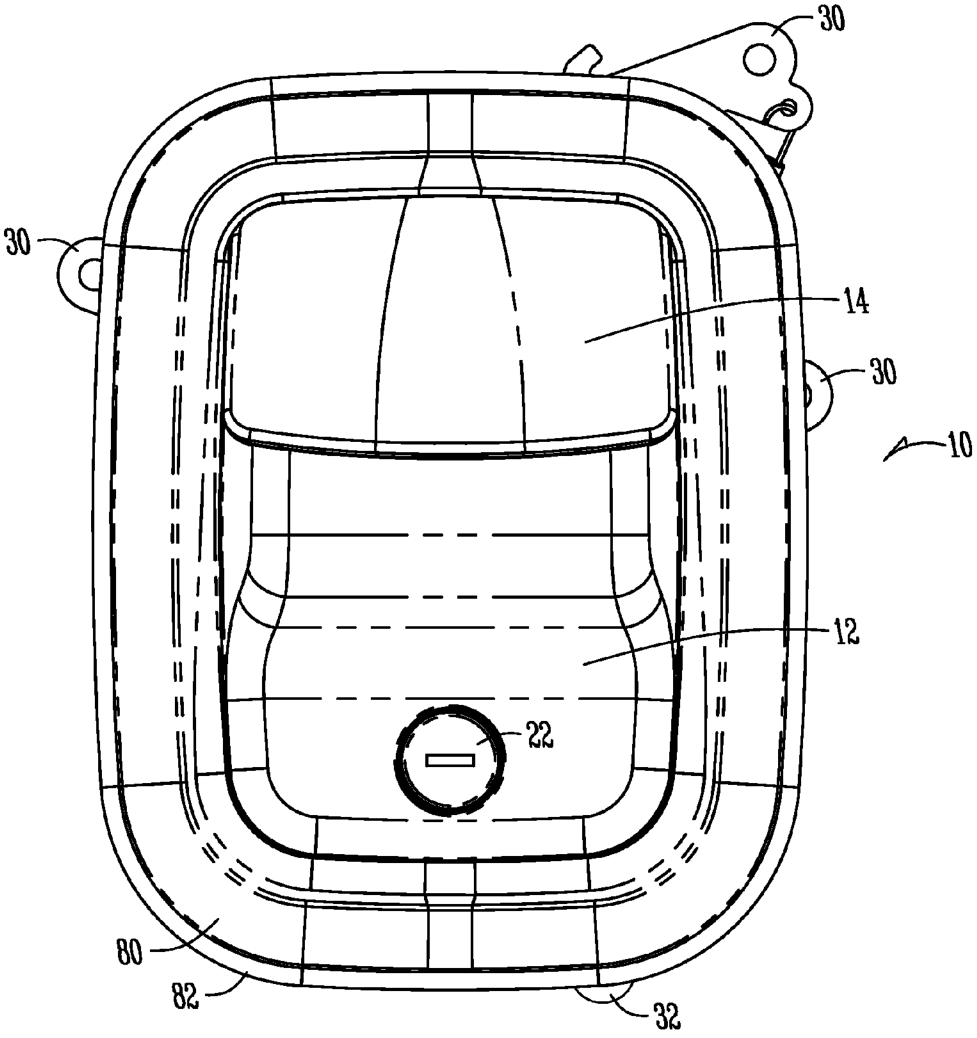
FIG. 10 is a front elevation view of the handle assembly unlocked with the paddle pulled to an actuated position.
Figure 11:
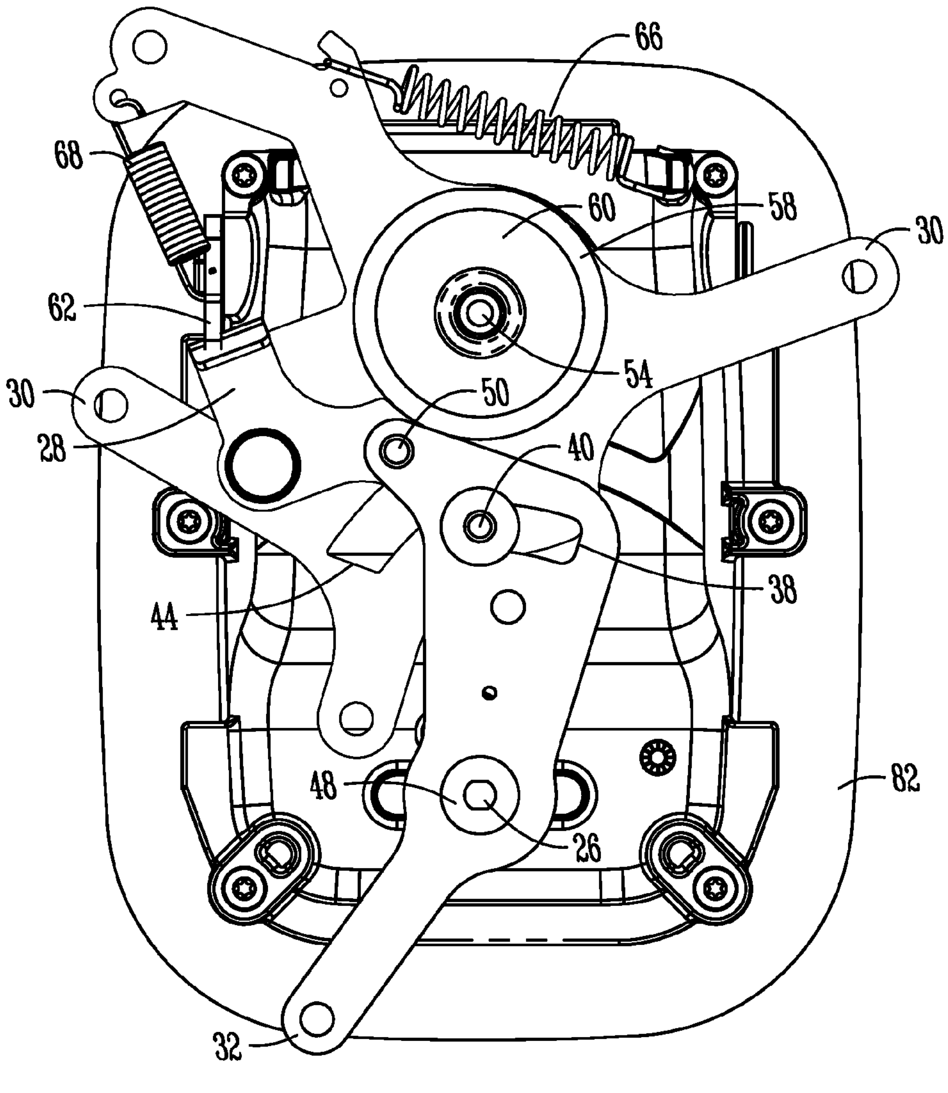
FIG. 11 is a rear elevation view of the handle assembly unlocked and the paddle actuated.
Figure 12:
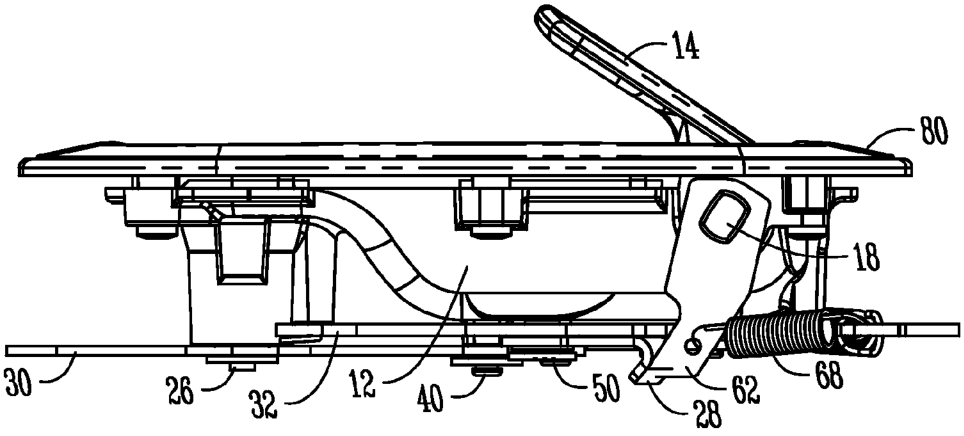
FIG. 12 is a side elevation view of the handle assembly unlocked and the paddle actuated.

The handle assembly 10 has two operating modes: locked and unlocked. When the lock cylinder 22 is rotated to the locked position by a key, and then back to the home position, the lock arm 32 is pivoted by the actuator 26 to the position shown in FIG. 5 wherein the pin 40 is at the left hand end of the slot 38 and the pin 50 is at the right end of the slot 52 in the drive plate 28. In this orientation, the drive plate 28 is aligned with the drive arm 62. When the paddle 14 is pulled from the rest or neutral position, as shown in FIGS. 4 and 6-9, to the operative or actuated position, shown in FIGS. 10 and 12, the axle 18 rotates the drive arm 62, which engages the tab 64 on the drive plate 28, thereby rotating the interconnected drive plate 28 and driven plate 30 about the axis of the stub shaft 54 to the position shown in FIG. 11. This actuation of the logic assembly by the paddle 14 releases the door latches via the cable or linkage connections between the arms of the driven plate 30 and the latches.

Figure 15:
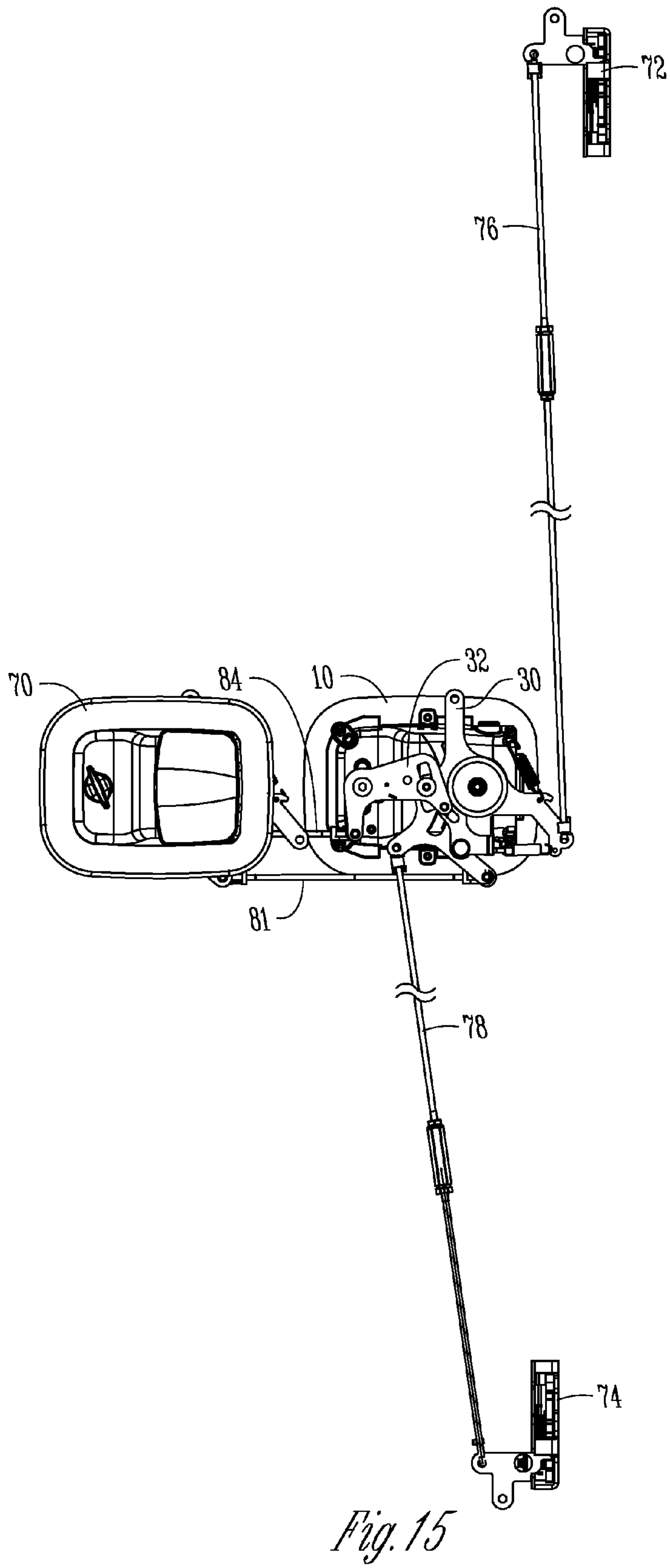
FIG. 15 is an outside schematic view showing the outside and inside handle assemblies linked together and to upper and lower latch mechanisms, with the outside handle assembly being unlocked and at rest.
Figure 16:
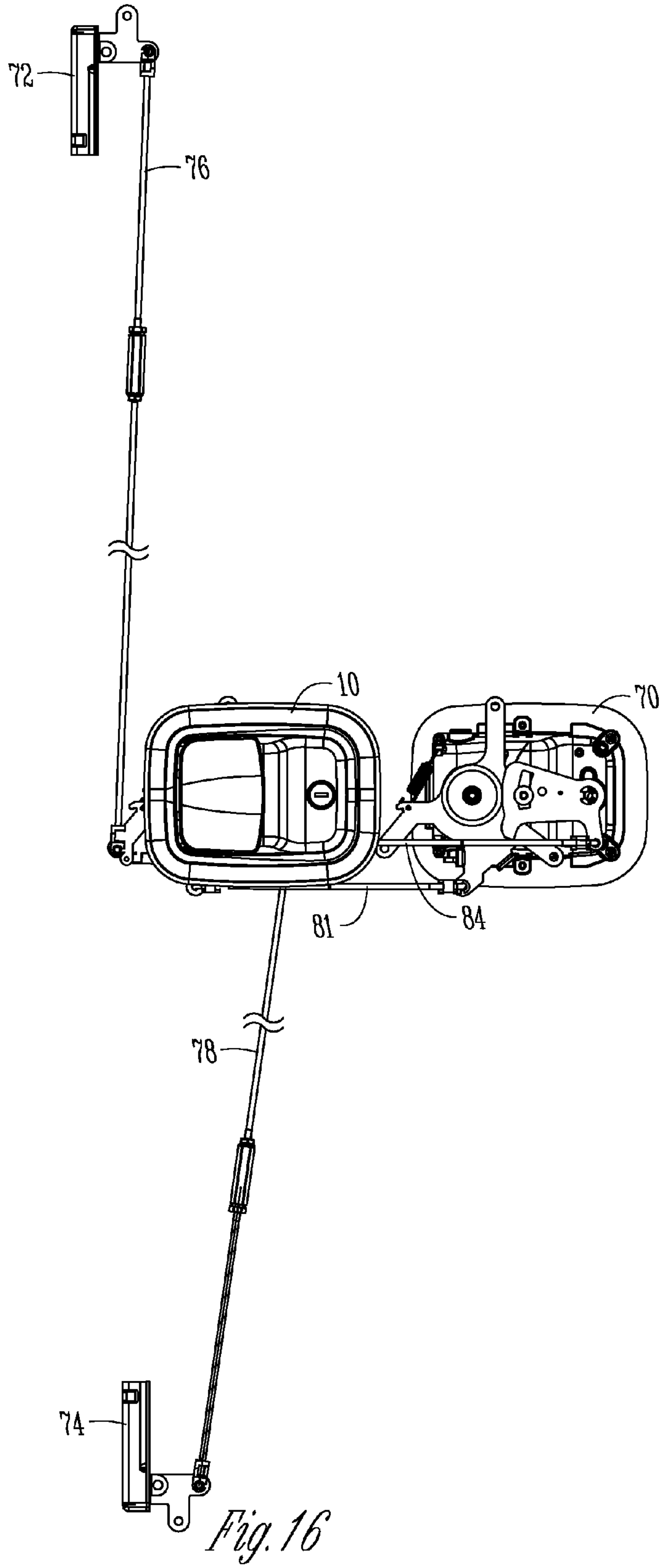
FIG. 16 is an inside schematic view showing the outside and inside handle assemblies linked together and to upper and lower latch mechanisms, with the handles being unlocked and at rest.
Figure 17:
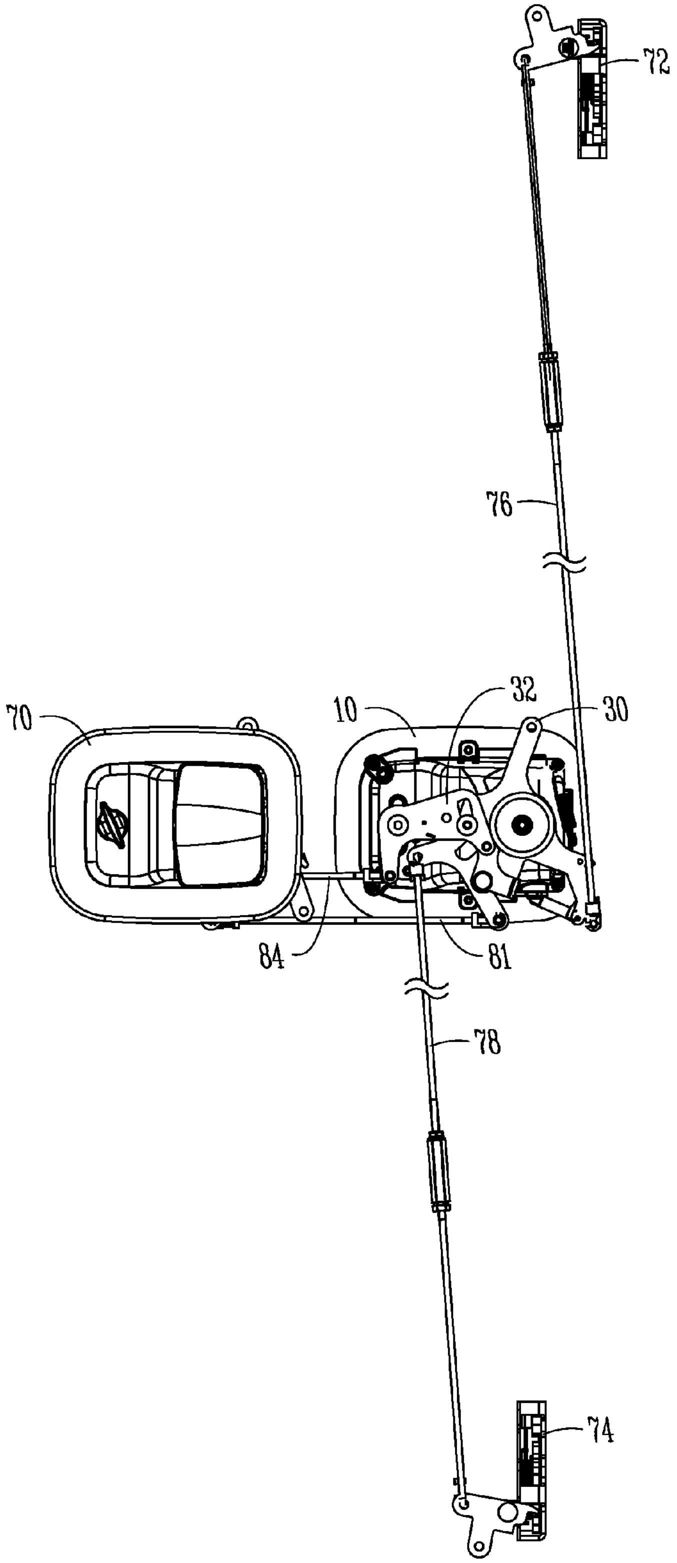
FIGS. 17 and 18 are similar to FIGS. 15 and 16, with the outside handle assembly being unlocked and actuated.
Figure 18:
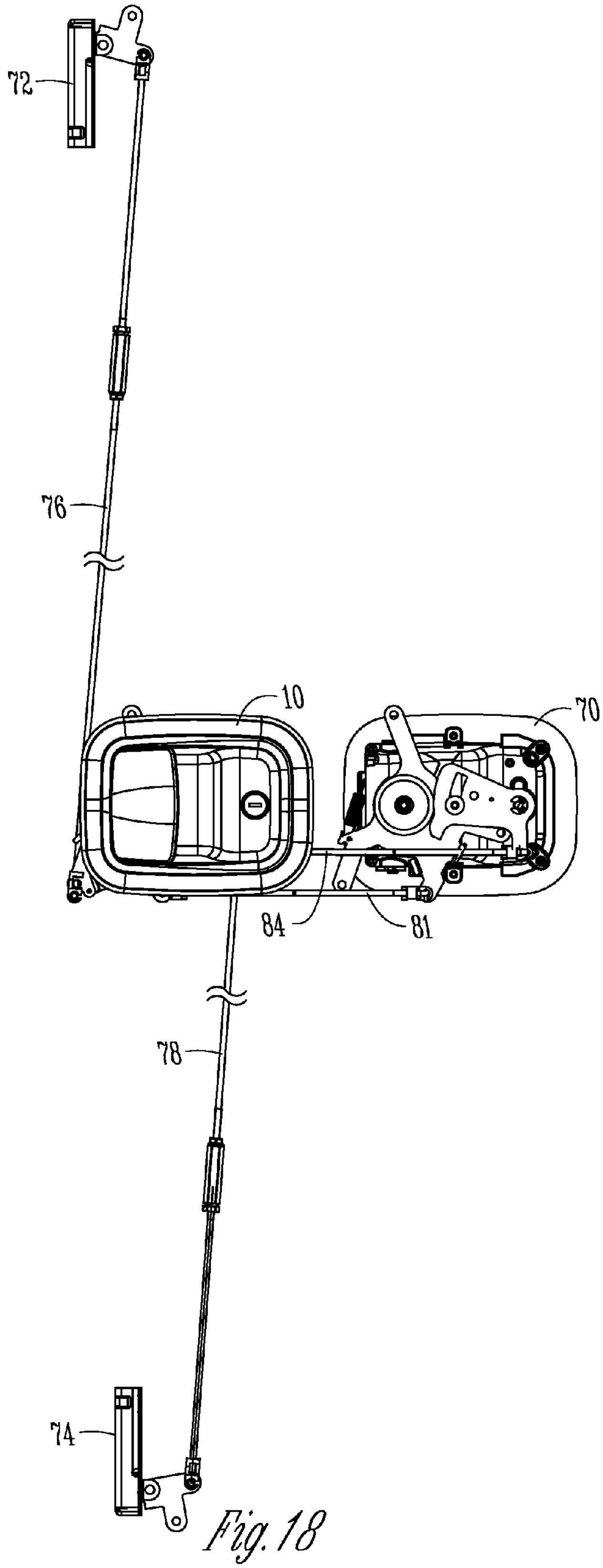
Figure 19:
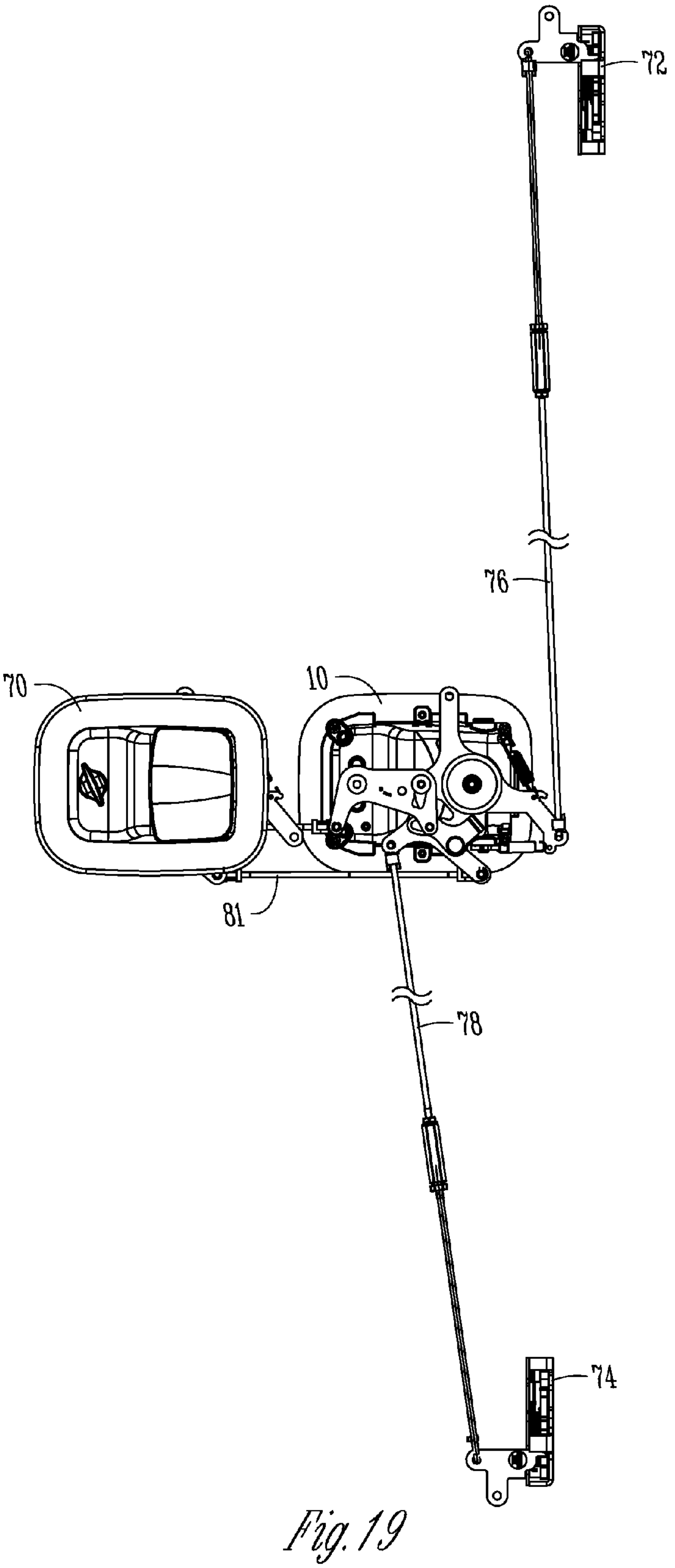
FIGS. 19 and 20 are similar to FIGS. 15 and 16, with the outside handle assembly being locked and actuated.
Figure 20:
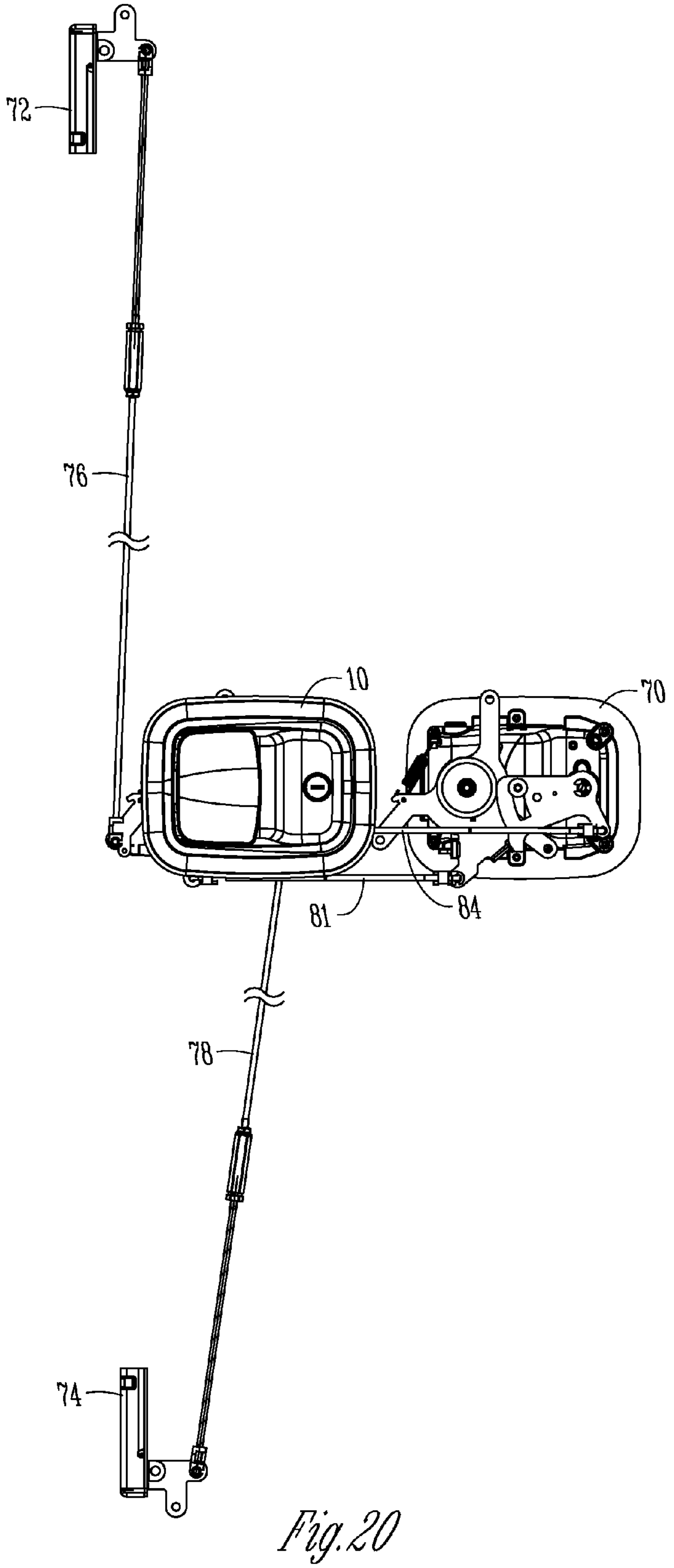

FIGS. 15 and 16 show the outside handle assembly 10 linked to an upper latch 72 and a lower latch 74 by linkage arms 76, 78, respectively. An inside handle assembly 70 is mounted on the door, in a conventional manner, and linked to the latches 72, 74, and to the driven plate 30 by a link arm 81 and the lock arm 32 by a link arm 84, as seen in FIGS. 15 and 16.

Figure 13:
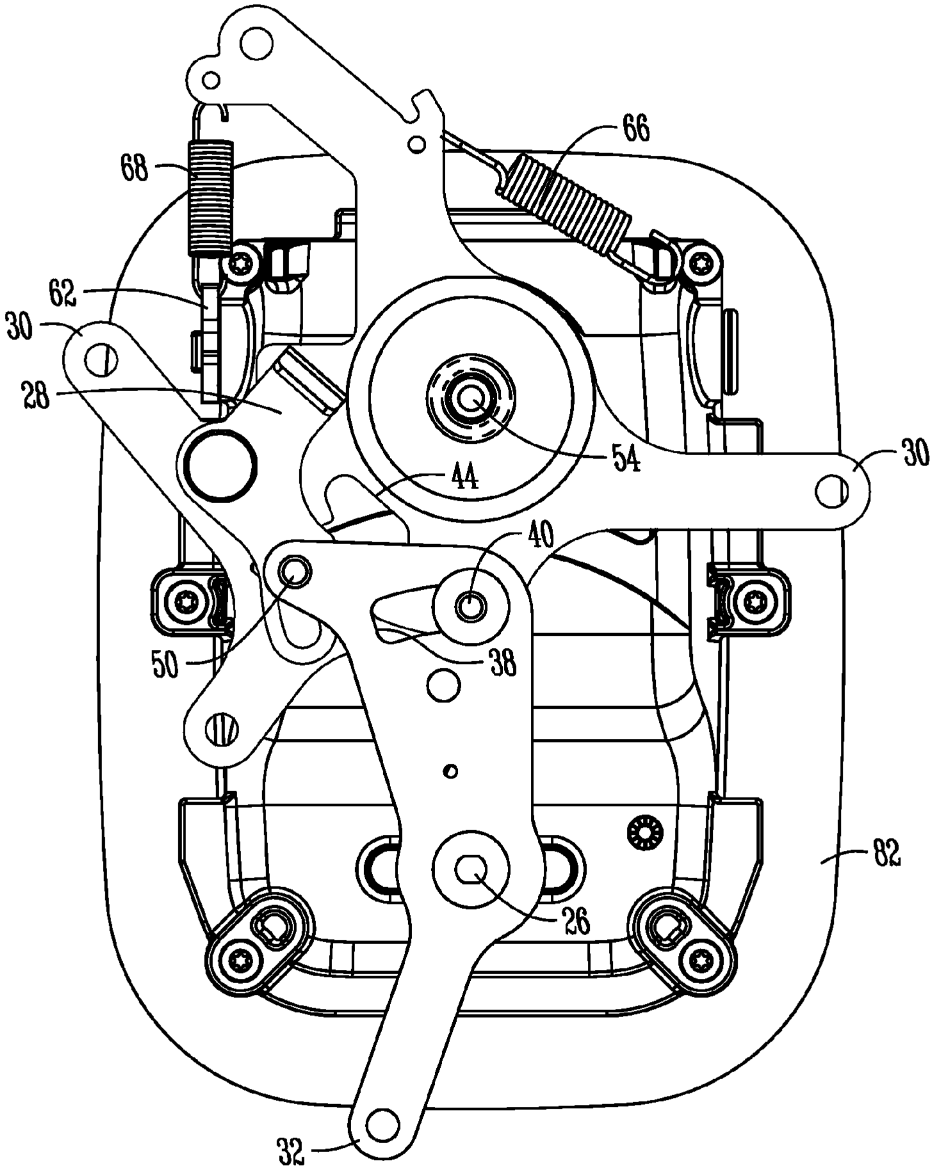
FIG. 13 is a rear elevation view of the handle assembly locked and the paddle at rest.
Figure 14:
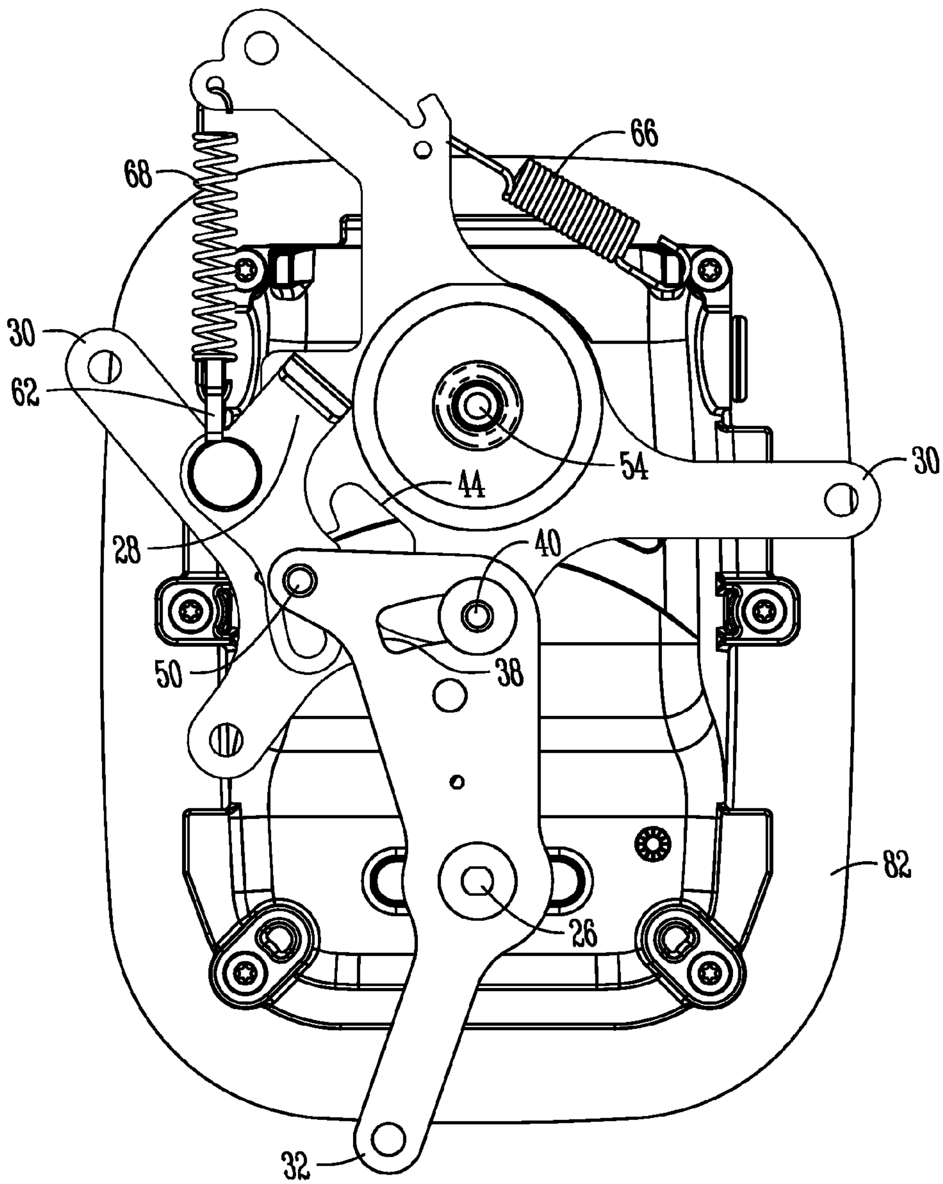
FIG. 14 is a rear elevation view of the handle assembly locked with the paddle actuated.

When the lock cylinder 22 is rotated to the locked position by an inserted key, and then returned to the home position so as to lock the cylinder 22, the actuator 26 rotates the lock arm 32 to the position shown in FIGS. 13 and 14, wherein the pin 40 is at the right end of the slot 38. This rotation of the lock arm 32 in turn pivots the drive plate 28 out of the alignment with the drive arm 62, via the sliding movement of the pin 50 to the opposite end of the slot 52 in the drive plate 28. When the paddle 14 is pulled from the rest or neutral position, the paddle axle 18 rotates the drive arm 62, which is disengaged from any of the components of the logic assembly, as seen in FIGS. 13 and 14. Thus, the paddle 14 free floats when the lock cylinder 22 is locked, and the logic assembly is inoperative such that the door latch remains latched or closed.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved paddle handle assembly for a vehicle having a latch movable between latched and unlatched positions, comprising:

- a housing having interior and exterior sides;
- a paddle pivotally mounted on the exterior side of the housing for movement between rest and actuated positions;
- a logic assembly on the interior side of the housing;
- the logic assembly including:
  - a driven plate pivotally mounted on the housing and being connected to the latch;
  - a drive plate pivotally mounted on the driven plate;
  - a lock arm pivotally mounted on the housing for movement between locked and unlocked positions;
- a drive arm connected to the paddle;
- whereby when the lock arm is in the unlocked position and the paddle is moved from the rest position to the actuated position, the paddle rotates the drive arm, which engages the drive plate so as to pivot the driven plate so as to unlatch the latch; and
- whereby when the lock arm is in the locked position, the drive plate is pivoted out of engagement with the drive arm such that the driven plate remains stationary when the paddle is moved from the rest position to the actuated position so that the latch remains latched.

2. The improved paddle handle assembly of claim 1 wherein the drive plate and driven plate are connected so as to both pivot in unison when the paddle is actuated and the lock arm is unlocked.

3. The improved paddle handle assembly of claim 1 wherein the drive plate and driven plate are connected and both remain stationary when the paddle is actuated and the lock arm is locked.

4. The improved paddle handle assembly of claim 1 further comprising a pin secured to the lock arm and extending through the drive plate and the driven plate.

5. The improved paddle handle assembly of claim 4 *herein the pin extends through a slot in the drive plate and a slot in the driven plate and moves along the slots when the lock arm is moved.

6. The improved paddle handle assembly of claim 1 wherein the drive plate connects the driven plate and the lock arm.

7. The improved paddle handle assembly of claim 1 wherein the driven plate is spring biased to a neutral position and pivots to an unlatching position.

8. The improved paddle handle assembly of claim 1. wherein the drive arm is spring biased to a neutral position and pivots a maximum rotation position engaging the drive plate when the lock arm is locked and disengaged from the drive plate when the lock arm is unlocked.

9. The improved paddle handle assembly of claim 1 wherein the lock arm pivots the drive plate between a first position aligned with the drive arm and a second position off-set from the drive arm.

10. The improved paddle handle assembly of claim 1 wherein the assembly is an outside handle assembly for the vehicle door to open the door from outside the vehicle, and further comprising an inside handle assembly for the vehicle door operatively connected to the latch and to the outside handle assembly to open the door from inside the vehicle.

11. The improved handle assembly of claim 10 wherein the inside handle assembly is connected to the driven plate by a first link arm and is connected to the lock arm by a second link arm.

12. A free floating paddle handle assembly for a vehicle door having a latch movable between open and closed positions, comprising:

- a housing having front and back sides;
- a paddle pivotally mounted on the front side of the housing;
- a logic assembly on the back side of the housing;
- the logic assembly including:
  - a driven plate pivotally mounted on the housing and being connected to the latch;
  - a drive plate pivotal :1y mounted on the driven plate;
  - a lock arm pivotally mounted on the housing for movement between locked and unlocked positions;
- wherein the drive plate and driven plate are connected so as to both pivot in unison when the paddle is pulled and the lock arm is unlocked so as to open the latch; and
- wherein the drive plate and driven plate are connected and both remain stationary when the paddle is pulled and the lock arm is locked so that the latch remains closed.

13. The free floating paddle handle assembly of claim 12 further comprising a drive arm connected to the paddle and moveable between a neutral position when the paddle is at rest and a triggered position when the paddle is pulled.

14. The free floating paddle handle assembly of claim 13 whereby the drive arm engages the drive plate when the lock arm is unlocked.

15. The free floating paddle handle assembly of claim .14 whereby the drive arm does not engage the drive plate when the lock arm is locked.

16. The free floating paddle handle assembly of claim 12 further comprising a pin secured to the lock arm and extending through the drive plate and the driven plate.

17. The free floating paddle handle assembly of claim 16 wherein the pin extends through a slot in the drive plate and a slot in the driven plate and moves along the slots when the lock arm is moved.

18. The free floating paddle handle assembly of claim 12 wherein the lock arm pivots the drive plate between a first position aligned with the drive arm and a second position off-set from the drive arm.

19. The improved paddle handle assembly of claim 12 wherein the assembly is an outside handle assembly for the vehicle door to open the door from outside the vehicle, and further comprising an inside handle assembly for the vehicle door operatively connected to the latch and to the outside handle assembly to open the door from inside the vehicle.

20. The improved handle assembly of claim 12 wherein the inside handle assembly is connected to the driven plate by a first link arm and is connected to the lock arm by a second link arm.

21. An improved paddle handle assembly for a vehicle having a latch movable between open and closed positions, comprising:

- a housing having interior and exterior sides and having a lock cylinder;
- a paddle pivotally mounted on the exterior side of the housing for movement between open and closed positions;
- a logic assembly on the interior side of the housing and operatively connected to the latch;
- the paddle actuating the logic assembly when the lock cylinder is unlocked so as to open the latch; and
- the paddle free floating without actuating any component of the logic assembly when the lock cylinder is locked such that the latch remains closed.

22. The improved paddle handle assembly of claim 21 wherein the logic assembly includes:

- a drive plate pivotally mounted on the housing;
- a driven plate pivotally mounted on the housing and being connected to the latch; and
- a lock arm pivotally mounted on the housing for movement between locked and unlocked positions.

23. The improved paddle handle assembly of claim 22 further comprising a drive arm connected to the paddle, whereby the drive arm engages the drive plate when the lock cylinder is unlocked and whereby the drive arm is disengaged from the drive plate when the lock cylinder is locked.

24. The improved paddle handle assembly of claim 23 wherein the lock arm is connected to the lock cylinder.

* * * * *